No. 878,075. PATENTED FEB. 4, 1908.
H. D. B. LEFFERTS & E. DE CAMP.
PNEUMATIC TIRE.
APPLICATION FILED JAN. 15, 1907.
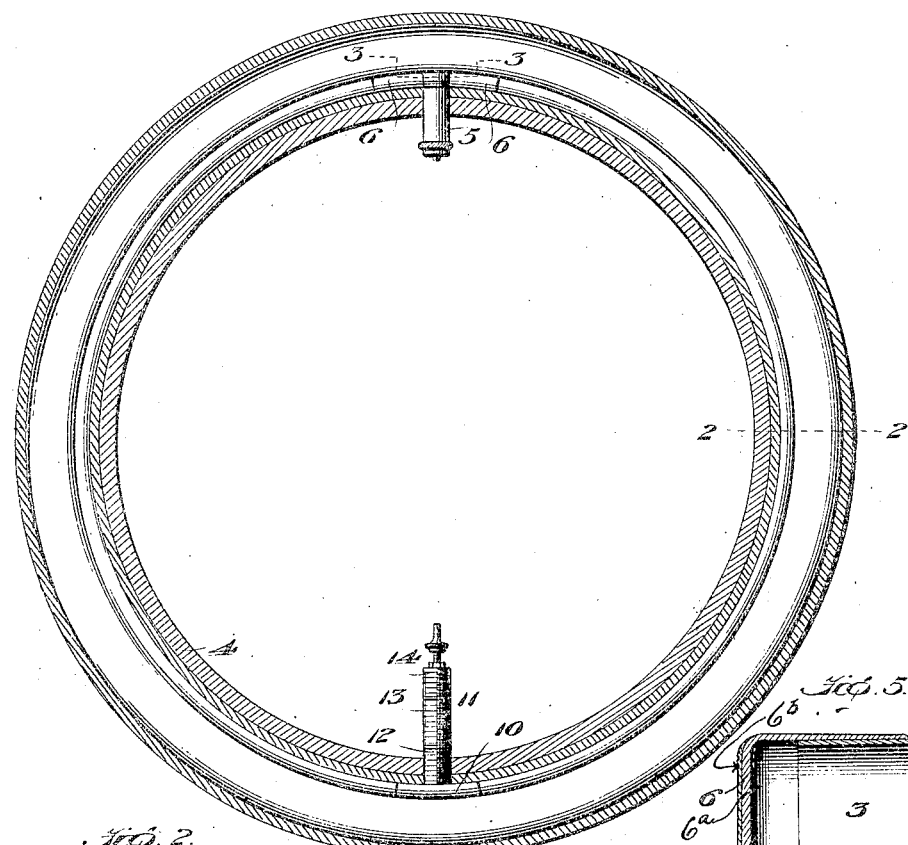
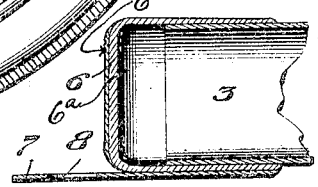
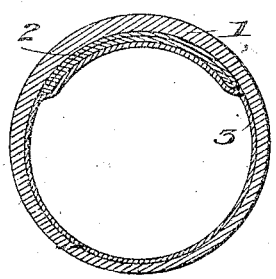
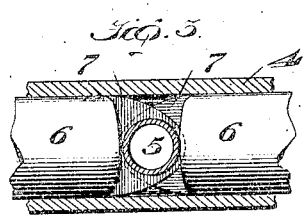
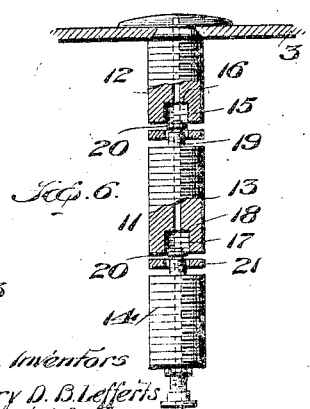
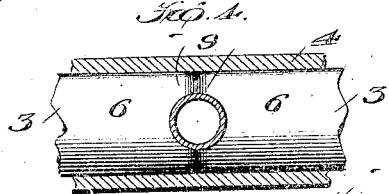
Witnesses
Inventors
Henry D. B. Lefferts
Eliphalet De Camp
By D. T. Holhaupter Attorney

UNITED STATES PATENT OFFICE.

HENRY D. B. LEFFERTS AND ELIPHALET DE CAMP, OF ORANGE, NEW JERSEY.

PNEUMATIC TIRE.

No. 878,075.  Specification of Letters Patent.  Patented Feb. 4, 1908.

Application filed January 15, 1907. Serial No. 352,440.

*To all whom it may concern:*

Be it known that we, HENRY D. B. LEFFERTS and ELIPHALET DE CAMP, citizens of the United States, residing at Orange, in the county of Essex and State of New Jersey, have invented certain new and useful Improvements in Pneumatic Tires, of which the following is a specification.

This invention relates to the subject of pneumatic tires and has special reference to certain improvements therein possessing special utility in connection with that type of self-repairing tire disclosed in my Patent No. 827,927, dated August 7, 1906.

To this end the invention has in view an improvement in the structural formation of the supplemental reserve tube utilized in the type of tire shown in said former patent, and also in the valve stem fitting therefor, whereby the positioning of the reserve tube on the wheel rim is greatly facilitated.

The special object of the invention is to provide a normal deflated reserve tube with a valve stem fitting of variable length, that is, so constructed as to be capable of being lengthened and shortened as the diameter of the tire may require.

With these and other objects in view which will be readily apparent to tire manufacturers and fitters, the invention consists in the novel construction, combination and arrangement of parts hereinafter more fully described, illustrated and claimed.

The essential features of the invention, involved in the new features of the reserve tube, including the extensible and contractible valve stem, are susceptible to modification without departing from the scope of the invention, but a preferred embodiment of the invention is shown in the accompanying drawings, in which Figure 1 is a circumferential or longitudinal sectional view of a pneumatic tire embodying the improvements contemplated by the present invention. Fig. 2 is a cross sectional view on the line 2—2, of Fig. 1, but showing the main inner tube deflated and the supplemental reserve tube inflated. Fig. 3 is a detail sectional view on the line 3—3 of Fig. 1, showing in plan the end portions of the supplemental tube and the holding means therefor. Fig. 4 is a view similar to Fig. 3, showing the interlocking action of the supplemental tube when the same is inflated. Fig. 5 is an enlarged detailed sectional view of one end portion of the supplemental reserve tube. Fig. 6 is an enlarged sectional elevation of the extensible and contractible valve stem for the reserve tube.

As in my former patent aforesaid, the present invention requires no material change in the usual construction of an inner tube pneumatic tire, and a tire fitted up to make a self-repairing tire in accordance with the present invention embodies in its general construction the main outer casing 1, an inflatable main inner tube 2, an inflatable supplemental reserve tube 3, which parts are assembled in operative relation and placed upon the wheel rim 4.

The main inner tube 2 is usually of the common continuous type arranged wholly within the outer casing and extending entirely around the same. At a convenient point, the tube 2 is fitted with the usual inflating valve stem 5, in communication with the interior of the tube and operating in the usual manner.

The supplemental inner tube 3, lies wholly without the main inner tube and is interposed between the inner side of the latter and the wheel rim. Also, the said reserve tube 3 is of a divided construction and arranged with its separate end portions 6, disposed upon opposite sides of the valve stem 5, for the main inner tube, and held in close abutting relation to said stem through the medium of holding tabs 7. These holding tabs 7 preferably consist of strips of canvas or canvas and rubber vulcanized, or otherwise suitably secured permanently to the end portions of the tube 3, and projected beyond said end portions. The said holding tabs are also provided with valve openings 8, receiving therein the valve stem 5, thereby providing means for holding the end portions of the divided end tube up to and against the said valve stem 5 and thereby preventing a relative displacement of the parts when the tube 3 is deflated, and the tube 2 is inflated.

In order to positively hold the parts in properly interlocked relation, and to fill up the entire interior inflatable space of the outer casing, the inner reserve tube 3 is constructed of a greater inflatable diameter than the main inner tube 2, so that when the latter is deflated and the supplemental tube inflated, thereby causing the valve stem 5 to be drawn further into the casing, the end portions of the latter will be distended, by inflation, about the said valve stem 5, thereby forming the inflated holding hooks 9. In order to secure this result with certainty the present invention contemplates forming the end portion 6 of the tube 3, of a softer material than the main body portion of the tube 3, and constructing said end portions in the form of caps telescoped and vulcanized upon the ends of the said tube 3, as may be plainly seen from Fig. 5 of the drawings. The caps are interlined with a heavy drilled canvas lining 6ª, to strengthen them, and a strip 6ᵇ of heavy canvas is vulcanized on the end of the caps to prevent the wear of the rubber against valve stem of the main inner tube.

It has been found desirable in the practical manufacture of the reserve tube to form the same with a separate central valve stem section 10, to which may be more readily vulcanized or otherwise more suitably secured the inner end portion of the inflating valve stem 11, for the reserve tube. This inflating valve stem is entirely independent from the stem 5 of the main inner tube, but likewise projects inwardly through a hole in the wheel rim. The said valve stem 11 is preferably located diametrically opposite the holding means 7, for the divided reserve tube.

One of the distinctive features of the present invention resides in constructing the valve stem 11, so that the same may be extensible and contractible according as the diameter of the tire requires, and in order to permit the ready application of the reserve tube to the wheel rim. This result is accomplished by making the valve stem of a sectional formation, the same consisting of three or more detachably connected sections; the intermediate section or sections being interchangeable with the outermost section so that the requisite lengthening and shortening may be accomplished. For illustrative purposes the said valve stem 11 is shown as consisting of the minimum number of sections, that is, of the three sections 12, 13 and 14, which may be respectively termed the innermost section, the intermediate section and the outermost section.

Aside from its usual bore the innermost valve section 12 is provided in its outer end with a threaded socket 15, and the interior washer seat 16, at the base of said socket. The intermediate section 13 is likewise provided at one end with a similar socket 17, and washer seat 18, while the said intermediate and outer sections 13 and 14, are provided at one end with exteriorly threaded connecting pins 19, and inside washers 20 carried thereby. When the parts are secured together, interposed washers or gaskets 21 are placed between the opposing ends of the adjoining sections. Hence, when the several sections are secured together and the inside washers are tightened against the interior seats and the interposed washers are tightly clamped, a doubly protected air join is provided between each valve stem section, and by removing the intermediate section 13 and applying the outermost section 14 to the innermost section 12, the valve stem can be materially shortened. Obviously, any number of intermediate sections 13 may be employed and all of the sections may be of varying length, but in all constructions it is preferable to equip the outermost section 14 with some improved type of valve controlling the passage of air through the valve stem.

In applying the reserve tube, it is difficult to position the same entirely about the tire with a non-sectional valve stem of ordinary length. It is necessary to first insert the valve stem through the hole in the rim before the tire can be placed about the rim, and furthermore, as varying diameters of the tire will require different length valve stems, these conditions are fully met by the improved construction herein described. In this connection it may be further stated that in making up the tire and applying the same to the rim of a wheel, the first step is to lay the main inner tube on the floor and then arrange the divided reserve tube within the circle, and hence at the inner side, of said main inner tube. In this operation the ends of the reserve tube are secured in place by engaging the holding tabs 7 over the valve stem 5 of the main inner tube; and then both the main and the reserve tubes are placed within the outer casing 1 at the same time. When ready to place the outer casing, with its contained tubes 2 and 3, upon the rim of the wheel, both of the valve stems 5 and 11 necessarily project through the inner circumference of the casing, but in order that both valve stems may be properly inserted through their respective holes in the wheel rim, the sectional valve stem 11 is shortened by removing one or more sections thereof before commencing to work the completed tire on to the wheel rim. At the start, the valve stem 5 of the main inner tube is inserted through its hole in the wheel rim, after which the casing is worked into position on the rim until the shortened valve stem 11 comes opposite the hole provided therefor in the rim, after which it is only necessary to piece up the sectional valve stem from the inner side of the rim by inserting and screwing into place the removed section or sections of the said sectional valve stem.

From the foregoing, it is thought that the construction and many advantages of the herein described improvements will be apparent without further description.

I claim:

1. A pneumatic tire comprising an outer casing, a normally inflated main inner tube having a valve stem, and a normally deflated divided supplemental reserve tube arranged without the main inner tube and having terminal soft cap portions disposed in opposite relation to the valve stem, said soft cap portions being adapted to be inflated about said valve stem for the main inner tube.

2. In a tire of the class described, the combination with the outer casing and the main inner tube, of a normally deflated supplemental reserve tube having an extensible and contractible valve stem.

3. In a tire of the class described, the combination with the outer casing and the main inner tube, of the normally deflated supplemental reserve tube provided with an extensible and contractible valve stem, said valve stem consisting of a series of detachably connected valve stem sections having inner and outer washer joints.

4. In a tire of the class described, the combination with the outer casing and the main inner tube, of the normally deflated supplemental reserve tube provided with an extensible and contractible valve stem, said valve stem consisting of three or more detachably connected sections, the outermost valve carrying section being interchangeable with the intermediate section or sections, and the joint connection between each two sections consisting of a threaded socket and interior washer seat provided in and on one of the sections and an exteriorly threaded connecting pin and inside washer carried on the other of said sections.

In testimony whereof we hereunto affix our signatures in the presence of two witnesses.

HENRY D. B. LEFFERTS.
ELIPHALET DE CAMP.

Witnesses:
ARTHUR J. McDEVITT,
THOMAS McDEVITT.